(12) United States Patent
Kim et al.

(10) Patent No.: US 11,811,018 B2
(45) Date of Patent: Nov. 7, 2023

(54) CATHODE FOR LITHIUM-SULFUR BATTERY, AND LITHIUM-SULFUR BATTERY COMPRISING SAME

(71) Applicant: LG CHEM, LTD., Seoul (KR)

(72) Inventors: Yun Kyoung Kim, Daejeon (KR); Doo Kyung Yang, Daejeon (KR); Seung Yoon Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 213 days.

(21) Appl. No.: 16/621,057

(22) PCT Filed: May 25, 2018

(86) PCT No.: PCT/KR2018/005997
§ 371 (c)(1),
(2) Date: Dec. 10, 2019

(87) PCT Pub. No.: WO2019/022358
PCT Pub. Date: Jan. 31, 2019

(65) Prior Publication Data
US 2020/0203756 A1  Jun. 25, 2020

(30) Foreign Application Priority Data

Jul. 28, 2017 (KR) .......... 10-2017-0096485

(51) Int. Cl.
| | |
|---|---|
| H01M 10/052 | (2010.01) |
| H01M 4/1397 | (2010.01) |
| H01M 4/36 | (2006.01) |
| H01M 4/38 | (2006.01) |
| H01M 4/62 | (2006.01) |
| H01M 10/0567 | (2010.01) |
| H01M 10/0569 | (2010.01) |
| H01M 4/02 | (2006.01) |
| H01M 4/131 | (2010.01) |
| H01M 4/134 | (2010.01) |

(52) U.S. Cl.
CPC ......... *H01M 10/052* (2013.01); *H01M 4/131* (2013.01); *H01M 4/134* (2013.01); *H01M 4/1397* (2013.01); *H01M 4/364* (2013.01); *H01M 4/382* (2013.01); *H01M 4/621* (2013.01); *H01M 10/0567* (2013.01); *H01M 10/0569* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2004/0091776 A1 | 5/2004 | Hwang | |
| 2004/0096749 A1 | 5/2004 | Kim et al. | |
| 2004/0253512 A1* | 12/2004 | Watanabe | H01M 50/183 429/210 |
| 2005/0048371 A1* | 3/2005 | Nagayama | H01M 4/80 429/236 |
| 2007/0082265 A1* | 4/2007 | Itou | H01M 4/131 429/223 |
| 2009/0202905 A1 | 8/2009 | Morita et al. | |
| 2011/0052998 A1 | 3/2011 | Liang et al. | |
| 2012/0189913 A1* | 7/2012 | Wakizaka | H01M 4/364 429/211 |
| 2012/0214043 A1 | 8/2012 | Olschimke et al. | |
| 2013/0181676 A1* | 7/2013 | Kourtakis | C04B 38/08 320/128 |
| 2014/0030603 A1* | 1/2014 | Wegner | H01M 4/137 252/500 |
| 2014/0099536 A1* | 4/2014 | Sun | H01M 4/5815 429/188 |
| 2014/0127575 A1 | 5/2014 | Scrosati et al. | |
| 2014/0255796 A1 | 9/2014 | Matsuoka et al. | |
| 2014/0315072 A1* | 10/2014 | Kobayashi | H01M 50/183 429/185 |
| 2014/0315104 A1 | 10/2014 | Liu et al. | |
| 2015/0140425 A1* | 5/2015 | Cyman, Jr. | H01M 4/12 429/217 |

(Continued)

FOREIGN PATENT DOCUMENTS

| | | |
|---|---|---|
| CN | 1499659 A | 5/2004 |
| CN | 1501540 A | 6/2004 |

(Continued)

OTHER PUBLICATIONS

Machine translation of JP04-329269, published on Nov. 18, 1992 (Year: 1992).*
Machine translation of JP11-260346, published on Sep. 24, 1999 (Year: 1999).*
Machine translation of JP07-254436, published on Oct. 3, 1995 (Year: 1995).*
Machine translation of JP2004-235068, published on Aug. 19, 2004 (Year: 2004).*
Lithium oxalate, Pub Chem, available online at https://pubchem.ncbi.nlm.nih.gov/compound/Lithium-oxalate, date unknown.*
Lithium oxalate, available online at https://en.wikipedia.org/wiki/Lithium_oxalate, date unknown.*

(Continued)

*Primary Examiner* — Anca Eoff
(74) *Attorney, Agent, or Firm* — Birch, Stewart, Kolasch & Birch, LLP

(57) ABSTRACT

A positive electrode for a lithium-sulfur battery and a lithium-sulfur battery including the same, and in particular, a positive electrode for a lithium-sulfur battery including an active material, a conductive material, a binder and an additive, wherein the additive includes an organic acid lithium salt, the organic acid lithium salt including a dicarboxyl group. By including a dicarboxyl group-including organic acid lithium salt as the additive, the positive electrode for the lithium-sulfur battery is capable of enhancing capacity and lifetime properties of the lithium-sulfur battery through enhancing lithium ion migration properties.

7 Claims, 3 Drawing Sheets

(56) References Cited

U.S. PATENT DOCUMENTS

| | | | |
|---|---|---|---|
| 2015/0147630 A1* | 5/2015 | Nakano | H01M 4/13 |
| | | | 429/188 |
| 2015/0171469 A1 | 6/2015 | Kourtakis et al. | |
| 2015/0236380 A1* | 8/2015 | Garsuch | H01M 10/0525 |
| | | | 429/339 |
| 2016/0093887 A1 | 3/2016 | Jang et al. | |
| 2016/0164103 A1 | 6/2016 | Son et al. | |
| 2017/0033418 A1* | 2/2017 | Suzuki | H01M 10/0525 |
| 2018/0114976 A1* | 4/2018 | Lee | H01M 10/0525 |
| 2018/0138503 A1 | 5/2018 | Kim et al. | |
| 2020/0266433 A1* | 8/2020 | Lee | H01M 4/136 |

FOREIGN PATENT DOCUMENTS

| | | | |
|---|---|---|---|
| CN | 1780031 A | | 5/2006 |
| EP | 1 714 348 B1 | * | 5/2010 |
| JP | 04-329269 | * | 11/1992 |
| JP | 7-254436 A | | 10/1995 |
| JP | 09-213375 | * | 8/1997 |
| JP | 11-260346 | * | 9/1999 |
| JP | 2003-86249 A | | 3/2003 |
| JP | 2004-14472 A | | 1/2004 |
| JP | 2004-235068 A | | 8/2004 |
| JP | 2006-92881 A | | 4/2006 |
| JP | 2006-344523 A | | 12/2006 |
| JP | 2009-193780 A | | 8/2009 |
| JP | 2016-540353 A | | 12/2016 |
| JP | 2017-54822 A | | 3/2017 |
| JP | 2017-517835 A | | 6/2017 |
| KR | 10-0398468 B1 | | 9/2003 |
| KR | 10-2006-0098789 A | | 9/2006 |
| KR | 10-2014-0103940 A | | 8/2014 |
| KR | 10-2015-0032670 A | | 3/2015 |
| KR | 10-1497330 B1 | | 3/2015 |
| KR | 10-2016-0046775 A | | 4/2016 |
| KR | 10-2016-0128014 A | | 11/2016 |
| KR | 10-2017-0032190 A | | 3/2017 |
| WO | WO 2015/084940 A1 | | 6/2015 |
| WO | WO 2015/153729 A1 | | 10/2015 |
| WO | WO 2015/160381 A1 | | 10/2015 |
| WO | WO 2016/197098 A1 | | 12/2016 |

OTHER PUBLICATIONS

Tetraethylene glycol dimethyl ether, available at https://en.wikipedia.org/wiki/Tetraethylene_glycol_dimethyl_ether#:~:text=Tetraethylene%20glycol%20dimethyl%20ether%20(TEGDME,processes%20and%20high%20temperature%20reactions. , date unknown.*

Machine translation of JP 09-213375, published on Aug. 15, 1997 (Year: 1997).*

Extended European Search Report dated May 12, 2020, for European Application No. 18838620.5.

International Search Report issued in PCT/KR2018/005997 (PCT/ISA/210), dated Sep. 6, 2018.

* cited by examiner

[Figure 1]
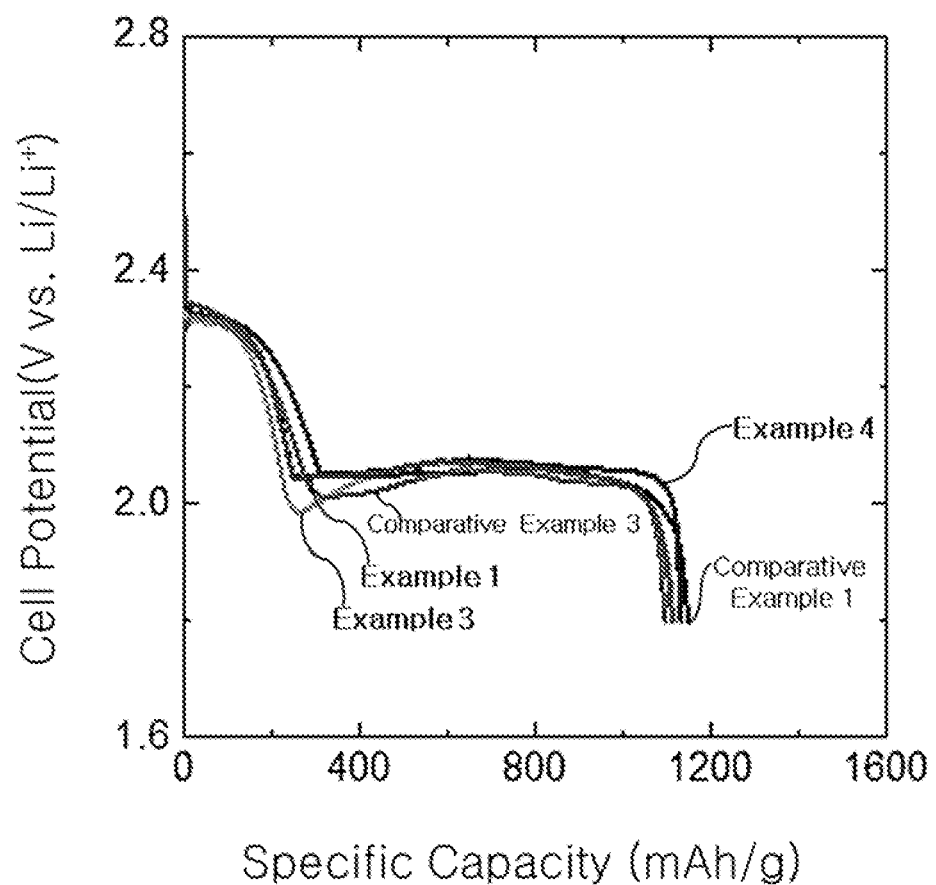

[Figure 2]
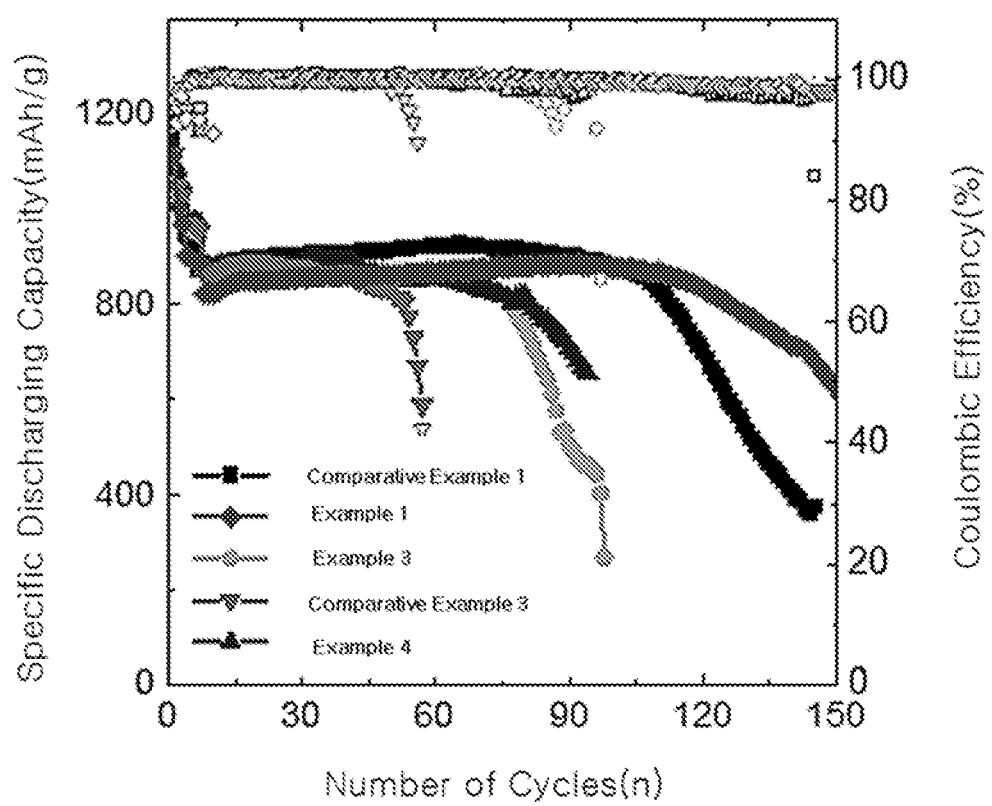

[Figure 3]
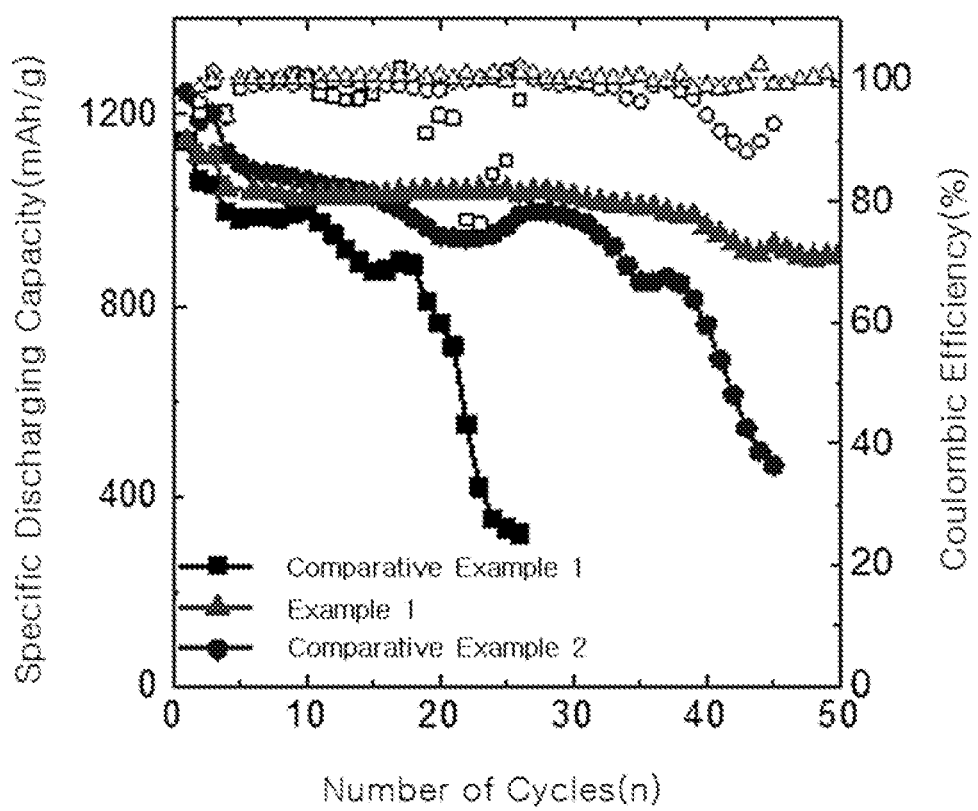

CATHODE FOR LITHIUM-SULFUR BATTERY, AND LITHIUM-SULFUR BATTERY COMPRISING SAME

TECHNICAL FIELD

This application claims the benefits of Korean Patent Application No. 10-2017-0096485, filed on Jul. 28, 2017 with the Korean Intellectual Property Office, the disclosure of which is herein incorporated by reference in its entirety.

The present invention relates to a positive electrode for a lithium-sulfur battery and a lithium-sulfur battery comprising the same.

BACKGROUND ART

As electronic devices and communication devices have rapidly become smaller, lighter and more sophisticated recently, and necessity of electric vehicles has highly emerged regarding environmental problems, there have been many demands for improving performance of secondary batteries that may be used as a power source of these products. As secondary batteries satisfying such demands, a number of studies have been progressed on lithium-sulfur batteries using sulfur-based materials as a positive electrode active material.

A lithium-sulfur battery is a secondary battery using a sulfur-based compound including sulfur-sulfur bonds as a positive electrode active material, and using lithium metal, a carbon-based material, which is capable of intercalation/deintercalation of metal ions such as lithium ions, or silicon, tin or the like forming an alloy with lithium as a negative electrode active material.

Specifically, an oxidation reaction of lithium occurs in a negative electrode, and a reduction reaction of sulfur occurs in a positive electrode of the lithium-sulfur battery. Sulfur has a cyclic $S_8$ structure before discharge, and electric energy is stored and produced using an oxidation-reduction reaction in which an oxidation number of sulfur decreases as sulfur-sulfur bonds are broken during a reduction reaction (discharge), and an oxidation number of sulfur increases as sulfur-sulfur bonds are formed again during an oxidation reaction (charge).

Particularly, the lithium-sulfur battery has theoretical discharge capacity of 1,675 mAh/g and theoretical energy density of 2,600 Wh/kg, which is theoretical energy density higher by approximately 5 times compared to currently studied lithium ion batteries (approximately 570 Wh/kg), and therefore, is a battery capable of obtaining high capacity, high energy density and long lifetime. In addition, sulfur, a main material of a positive electrode active material, has advantages of having a low atomic weight, being readily supplied by being abundant in resources, being low priced, having no toxicity and being environmental-friendly. And therefore, lithium-sulfur batteries have received attention as an energy source of medium-to-large devices such as electric vehicles as well as portable electronic devices.

Sulfur used as a positive electrode active material in a lithium-sulfur battery has electrical conductivity of $5 \times 10^{-30}$ S/cm, and is a nonconductor with no electrical conductivity, and therefore, has a problem in that electrons produced through an electrochemical reaction are difficult to migrate. As a result, sulfur has been composited with a conductive material such as carbon capable of providing an electrochemical reaction site when used.

Meanwhile, in order for sulfur to demonstrate sufficient performance in the lithium-sulfur battery, lithium ion conductivity is required together with electrical conductivity. However, a sulfur-carbon composite that has been used as a positive electrode active material in conventional lithium-sulfur batteries still has low lithium ion conductivity, and as a result, various technologies have been proposed.

As one example, Korean Patent Application Publication No. 2016-0046775 discloses that, by providing a positive electrode coating layer formed with an amphipathic polymer on a part of a surface of a positive electrode active site including a sulfur-carbon composite, cycle properties of a battery may be enhanced by facilitating lithium ion migration as well as suppressing polysulfide elution.

In addition, Korean Patent Application Publication No. 2002-0066783 discloses that ion conductivity may increase by including polyethylene oxide (PEO) and an inorganic lithium salt in a sulfur positive electrode for a lithium battery.

These patents have somewhat improved lithium ion conductivity through additives or a coating layer, however, the effect is not sufficient. Accordingly, development of a positive electrode for a lithium-sulfur battery having excellent lithium ion conductivity has been more required.

PRIOR ART DOCUMENTS

Patent Documents

Korean Patent Application Publication No. 2016-0046775 (2016 Apr. 29), CATHODE FOR LITHIUM-SULFUR BATTERY AND METHOD OF PREPARING THE SAME Korean Patent Application Laid-Open Publication No. 2002-0066783 (2002 Aug. 21), Sulfur positive electrode for lithium battery and IT'S FABRICATION METHOD

DISCLOSURE

Technical Problem

As a result of extensive studies in view of the above, the inventors of the present invention have identified that battery performance, stability and lifetime are enhanced when including a dicarboxyl group-including organic acid lithium salt in a positive electrode for a lithium-sulfur battery as an additive by improving lithium ion conductivity, and have completed the present invention.

Accordingly, an aspect of the present invention provides a positive electrode for a lithium-sulfur battery having excellent performance and lifetime properties.

In addition, another aspect of the present invention provides a lithium-sulfur battery including the positive electrode.

Technical Solution

According to an aspect of the present invention, there is provided a positive electrode for a lithium-sulfur battery comprising an active material, a conductive material, a binder and an additive, wherein the additive comprises an organic acid lithium salt including a dicarboxyl group.

The organic acid lithium salt may include an oxalate group or a malonate group.

The organic acid lithium salt may comprise at least one selected from the group consisting of dilithium oxalate, lithium hydrogen oxalate, lithium bis(oxalato)borate, dilithium malonate, lithium hydrogen malonate and lithium bis(malonato)borate.

The organic acid lithium salt may be included in an amount of from greater than 0.1% by weight to less than 5% by weight, based on 100% by weight of the total positive electrode for a lithium-sulfur battery.

According to another aspect of the present invention, there is provided a lithium-sulfur battery including the positive electrode.

Advantageous Effects

Through including a dicarboxyl group-including organic acid lithium salt as an additive, a positive electrode for a lithium-sulfur battery according to the present invention is capable of enhancing capacity and lifetime properties of a lithium-sulfur battery by improving lithium ion migration properties.

DESCRIPTION OF DRAWINGS

FIG. 1 is a graph presenting charge and discharge properties of a battery according to Experimental Example 1 of the present invention.

FIG. 2 is a graph presenting lifetime properties of batteries manufactured in Example 1, Example 3, Example 4, Comparative Example 1 and Comparative Example 3 of the present invention.

FIG. 3 is a graph presenting lifetime properties of batteries manufactured in Example 1, Comparative Example 1 and Comparative Example 2 of the present invention.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Since a lithium-sulfur battery has significantly higher discharging capacity and theoretical energy density compared to the conventional lithium secondary batteries and sulfur, which is used as a positive electrode active material, has the advantage of being abundant in reserves and low in price and being environmentally friendly, the lithium-sulfur battery has received attention as a next-generation battery.

Despite such advantages, there have been difficulties in obtaining full theoretical capacity and energy density in actual operation. This is due to the fact that a percentage of sulfur participating in an actual electrochemical redox reaction is very low due to low lithium ion conductivity of sulfur, a positive electrode active material. Capacity and efficiency of a lithium-sulfur battery may vary depending on the amount of lithium ions transferred to a positive electrode. Accordingly, increasing lithium ion conductivity of a positive electrode is important in obtaining a high capacity and high efficiency lithium-sulfur battery.

In addition thereto, lithium polysulfide formed in a positive electrode is eluted from a positive electrode reaction area during charge and discharge reactions, causing a shuttle phenomenon that move between a positive electrode and a negative electrode in a lithium-sulfur battery. Herein, by a side reaction between lithium polysulfide eluted from the positive electrode and lithium metal that is a negative electrode, reaction activity decreases as lithium sulfide is stuck on the lithium metal surface, and lithium ions are unnecessarily consumed leading to a problem of accelerating efficiency and lifetime decreases in the battery.

In the prior art, methods of increasing a lithium salt concentration in an electrolyte or introducing an additive or a coating layer to an electrolyte or a positive electrode have been used in order to enhance lithium ion conductivity, however, these methods have not been able to effectively improve performance and lifetime of a lithium-sulfur battery.

In view of the above, the present invention provides a positive electrode for a lithium-sulfur battery improving problems such as decline in the electrode reactivity and stability and thereby having enhanced capacity and lifetime properties by complementing low lithium ion conductivity of the conventional positive electrodes for a lithium-sulfur battery.

Specifically, the positive electrode for a lithium-sulfur battery the present invention comprises an active material, a conductive material, a binder and an additive, wherein the additive comprises an organic acid lithium salt including a dicarboxyl group.

In order to improve lithium ion conductivity, a concentration of a lithium salt in an electrolyte was increased or an inorganic or organic lithium salt was added in the prior art, and particularly, an organic lithium salt has been mainly used as an additive for an electrolyte with the purpose of forming a protective layer or maintaining battery performance. However, the present invention includes an organic acid lithium salt in a positive electrode composition instead of in an electrolyte.

According to the present invention, by introducing the dicarboxyl group-including organic acid lithium salt to a positive electrode, a certain level of lithium ion concentration is secured in the positive electrode, and as a result, low lithium ion conductivity of a positive electrode described above may be improved, and a problem of reactivity decline in electrodes, particularly, a positive electrode, is resolved therefrom.

In addition, including a large amount of lithium salt in an electrolyte or introducing an inorganic or organic lithium salt as an additive of an electrolyte as in the prior art increases electrolyte liquid viscosity, and causes changes in the reactivity such as lithium ion transfer in an electrolyte or lithium polysulfide dissolution to deteriorate battery capacity and output properties. In addition, changes in the composition or the content of the electrolyte as above function as impurities as the battery cycle progresses leading to a problem of increasing resistance in the battery and rapidly decreasing battery capacity and lifetime. However, by including the organic acid lithium salt in a positive electrode, the present invention may effectively increase lithium ion conductivity in the positive electrode without affecting other battery constituents including an electrolyte, and an advantage of complementing lithium ion consumption caused during charge and discharge reactions, electrolyte decomposition or side reactions occurring with cycle progression in the battery may be obtained as well.

The organic acid lithium salt according to the present invention may include a dicarboxyl group represented by the following Chemical Formula 1:

[Chemical Formula 1]

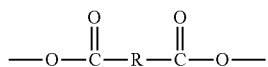

wherein R is a single bond or a methanediyl group.

Chemical Formula 1 may be oxalate ($C_2O_4^{2-}$) or malonate ($CH_2(C_2O_4)^{2-}$), and may preferably be oxalate.

Examples of the organic acid lithium salt including the dicarboxyl group of Chemical Formula 1 may include at least one selected from the group consisting of dilithium oxalate, lithium hydrogen oxalate, lithium bis(oxalato)borate, dilithium malonate, lithium hydrogen malonate and lithium bis(malonato)borate. Preferably, at least one selected from the group consisting of dilithium oxalate, lithium hydrogen oxalate and dilithium malonate may be included, and more preferably, dilithium oxalate may be included.

The organic acid lithium salt of the present invention is a compound substituting hydrogen of a hydroxyl group of a compound including the dicarboxyl group of Chemical Formula 1 with lithium, and includes a large amount of lithium ions in the compound. Accordingly, the organic acid lithium salt is a lithium-rich compound, and, as described above, may greatly increase lithium ion conductivity in a positive electrode even when added in a small amount during positive electrode preparation, and improves a problem of electrode reactivity decline therefrom. In addition, even when sulfur is loaded in excess, the organic acid lithium salt secures a constant lithium ion concentration in the positive electrode, and thereby improves a problem of capacity or reactivity decline occurring during high-loading of sulfur in the prior art. In addition thereto, the organic acid lithium salt has a small molecular weight and does not affect driving of rage other constituents in the battery, which is effective compared to existing changes in the electrolyte, and by supplementing lithium ions consumed in charge and discharge reactions, electrolyte liquid decomposition or side reactions occurring with cycle progression in the battery, prevents lifetime decline in the battery.

The organic acid lithium salt may be prepared by neutralizing an acid compound having the dicarboxyl group of Chemical Formula 1 with a base compound including a lithium salt, and herein, common methods may be used as the neutralization method. The base compound may be lithium hydroxide.

The organic acid lithium salt may be included in an amount of from greater than 0.1% by weight to less than 5% by weight and preferably from 0.1% by weight to 3% by weight based on 100% by weight of the total positive electrode for a lithium-sulfur battery. When the content of the organic acid lithium salt included in the positive electrode is less than the above-mentioned range, the effect of addition is insignificant leading to little effect in improving lithium ion conducting properties of the positive electrode, and when the content exceeds the above-mentioned range on the contrary, it may function as resistance or adversely affect battery performance by causing an unnecessary reaction when driving a battery, or the organic acid lithium salt may not be uniformly dispersed into the positive electrode, and therefore, a proper content is preferably determined within the above-mentioned range. However, a specific optimal content of the organic acid lithium salt may vary depending on other properties of a positive electrode to provided and a battery provided therewith and environments of use, and such use is not limited by the preferred range.

Meanwhile, the positive electrode for a lithium-sulfur battery of the present invention may include a sulfur-based compound as an active material. The sulfur-based compound may include at least one selected from the group consisting of inorganic sulfur ($S_8$), $Li_2S_n$ ($n \geq 1$), organosulfur compounds and carbon-sulfur polymers [$(C_2S_x)_n$, x=2.5 to 50, n≥2]. Preferably, inorganic sulfur ($S_8$) may be used.

The sulfur-based compound alone does not have electrical conductivity, and therefore, is composited with a conductive material when used. Preferably, the active material may have a sulfur-carbon composite form, and adding the organic acid lithium salt of the present invention does not affect the sulfur-carbon composite structure retention.

In addition to the compositions described above, the active material of the present invention may further include at least one additives selected from among transition metal elements, group IIIA elements, group IVA elements, sulfur compounds of these elements, and alloys of these elements and sulfur.

The transition metal element may include Sc, Ti, V, Cr, Mn, Fe, Co, Ni, Cu, Zn, Y, Zr, Nb, Mo, Tc, Ru, Rh, Pd, Os, Ir, Pt, Au, Hg or the like, the group IIIA element may include Al, Ga, In, Ti or the like, and the group IVA element may include Ge, Sn, Pb or the like.

The active material may be included in an amount of from 50% by weight to 95% by weight and preferably from 70% by weight to 95% by weight, based on 100% by weight of the total positive electrode for a lithium-sulfur battery. When the active material is included in less than the above-mentioned range, the electrode reaction is difficult to sufficiently obtain, and when included in exceeding the above-mentioned range, a sufficient electrode reaction is difficult to secure since the content of the conductive material and the content of the binder are relatively insufficient, and therefore, a proper content is preferably determined within the above-mentioned range.

The conductive material among constituents forming the positive electrode for a lithium-sulfur battery of the present invention is a material performing a role of a path for electrons migrating from a current collector to an active material by electrically connecting an electrolyte and the active material, and materials having porosity and conductivity may be used without limit.

For example, carbon-based materials having porosity may be used, and as such carbon-based materials, carbon black, graphite, graphene, active carbon, carbon fiber and the like may be included, and metallic fibers such as a metal mesh; metallic powders such as copper, silver, nickel or aluminum; or organic conducting materials such as polyphenylene derivatives may be included. The conductive materials may be used either alone or as a mixture. As products commercially available currently, acetylene black series (products of Chevron Chemical Company or Gulf Oil Company, or the like), ketjen black EC series (products of Armak Company), Vulcan XC-72 (products of Cabot Company), super P (products of MMM) and the like may be included.

The conductive material may be included in an amount of from 1% by weight to 10% by weight and preferably from 1% by weight to 5% by weight, based on 100% by weight of the total positive electrode for a lithium-sulfur battery. When the content of the conductive material included in the positive electrode is less than the above-mentioned range, parts of the active material that may not react increase in the electrode ultimately causing a decrease in the capacity, and the content being over the above-mentioned range adversely affects high efficiency discharge properties and charge and discharge cycle lifetime, and therefore, a proper content is preferably determined with the above-described range.

The binder among constituents forming the positive electrode for a lithium-sulfur battery of the present invention is a material included for maintaining a slurry composition forming the positive electrode on a current collector, and materials favorably dissolved in a solvent and capable of stably forming a conducting network with the active material and the conductive material described above are used. Unless particularly limited, all binders known in the art may be used. For example, as the binder, one type selected from the group consisting of fluororesin-based binders including polyvinylidene fluoride (PVdF) or polytetrafluoroethylene (PTFE); rubber-based binders including styrene-butadiene rubber (SBR), acrylonitrile-butadiene rubber or styrene-isoprene rubber; cellulose-based binders including carboxylmethylcellulose (CMC), starch, hydroxypropylcellulose or regenerated cellulose; polyalcohol-based binders; polyolefin-based binders including polyethylene or polypropylene; polyimide-based binders; polyester-based binders; and silane-based binders, or mixtures or copolymers of two or more types thereof may be used.

The binder may be included in amount of from 1% by weight to 10% by weight and preferably from 5% by weight to 8% by weight, based on 100% by weight of the total positive electrode for a lithium-sulfur battery. When the binder content is less than the above-mentioned range, physical properties of the positive electrode decline causing detachment of the active material and the conductive material, and when the content exceeds the above-mentioned range on the contrary, the ratios of the active material and the conductive material relatively decrease in the positive electrode causing a decrease in the battery capacity, and therefore, a proper content is preferably determined in the above-described range.

The positive electrode for a lithium-sulfur battery according to the present invention including the organic acid lithium salt, the active material, the conductive material and the binder described above may be prepared using common methods.

For example, when preparing the positive electrode slurry, a dicarboxylic acid compound is dissolved in a solvent first, then a base compound including lithium is added thereto for titration, and the result is dried to prepare an organic acid lithium salt in a powder state. After that, the organic acid lithium salt, the active material, the conductive material and the binder are mixed to obtain a slurry composition for forming a positive electrode. After that, the slurry composition is coated on a current collector, and the result is dried to complete a positive electrode. Herein, as necessary, the current collector may be prepared subjected to compression molding so as to enhance electrode density.

By adding the organic acid lithium salt when preparing the positive electrode slurry composition as described above, the positive electrode for a lithium-sulfur battery of the present invention evenly distribute the organic acid lithium salt in the positive electrode leading to an excellent effect in improving lithium ion conductivity, and as a result, a separate additional process for dispersion is not required making convenient and efficient preparation possible.

The current collector is not particularly limited generally as long as it may be prepared to have a thickness of from 3 μm to 500 μm, and has high conductivity without inducing chemical changes to a battery. Specifically, conductive materials such as stainless steel, aluminum, copper or titanium may be used, and more specifically, a carbon-coated aluminum current collector may be used. Using a carbon-coated aluminum substrate has advantages compared to using aluminum substrates without carbon coating in that adhesive strength for the active material is superior, contact resistance is low, and corrosion of aluminum caused by polysulfide is prevented. In addition, the current collector may have various forms such as films, sheets, foil, nets, porous bodies, foams or non-woven fabrics.

In addition, the present invention provides a lithium-sulfur battery including the positive electrode for a lithium-sulfur battery described above.

The lithium-sulfur battery includes a positive electrode; a negative electrode; and a separator and an electrolyte interposed between the positive electrode and the negative electrode, and as the positive electrode, the positive electrode for a lithium-sulfur battery according to the present invention is used.

The positive electrode is by the present invention, and follows the descriptions provided above.

The negative electrode may include a negative electrode current collector and a negative electrode active material placed on the negative electrode current collector. Alternatively, the negative electrode may be a lithium metal plate.

The negative electrode current collector is for supporting the negative electrode active material, and is not particularly limited as long as it has high conductivity and is electrochemically stable in a voltage area of a lithium secondary battery. Examples thereof may include copper, stainless steel, aluminum, nickel, titanium, palladium, baked carbon, copper or stainless steel of which surface is treated with carbon, nickel, silver or the like, aluminum-cadmium alloys and the like.

The negative electrode current collector may strengthen binding strength with the negative electrode active material by forming micro unevenness on the surface, and various forms such as films, sheets, foil, meshes, nets, porous bodies, foams or non-woven fabrics may be used.

The negative electrode active material may include a material capable of reversibly intercalating or deintercalating lithium ($Li^+$), a material capable of reversibly forming a lithium-containing compound by reacting with lithium ions, lithium metal or a lithium alloy. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn). Preferably, the negative electrode active material may be lithium metal, and specifically, may have a form of a lithium metal thin film or lithium metal powder.

The method for forming the negative electrode active material is not particularly limited, and methods for forming layers or membranes commonly used in the art may be used. For example, methods such as pressing, coating or vapor deposition may be used. In addition, a case of assembling a battery without a lithium thin film on a current collector, and then forming a metal lithium thin film on the metal plate by initial charge also belongs to the negative electrode of the present invention.

The separator is for physically separating both electrodes in the lithium-sulfur battery of the present invention, and those commonly used as a separator in a lithium-sulfur battery may be used without particular limit, and those having an excellent electrolyte liquid moisture-containing ability while having low resistance for ion migration of the electrolyte are particularly preferred.

The separator may be formed with a porous substrate, and as the porous substrate, porous substrate commonly used in electrochemical devices may all be used, and for example, polyolefin-based porous membranes or non-woven fabrics may be used, however, the porous substrate is not limited thereto.

As examples of the polyolefin-based porous membrane, membranes formed with a polyolefin-based polymer such as polyethylene such as high density polyethylene, linear low density polyethylene, low density polyethylene and ultrahigh molecular weight polyethylene, polypropylene, polybutylene and polypentene each alone, or formed with a polymer mixing these may be included.

In addition to polyolefin-based non-woven fabrics, non-woven fabrics formed with, for example, polyethylene terephthalate, polybutylene terephthalate, polyester, polyacetal, polyamide, polycarbonate, polyimide, polyetheretherketone, polyether sulfone, polyphenylene oxide, polyphenylene sulfide, polyethylene naphthalate and the like each alone, or formed with a polymer mixing these may be used as the non-woven fabric. The structure of the non-woven fabric may include spunbond non-woven fabrics or meltblown non-woven fabrics formed with long fibers.

A thickness of the porous substrate is not particularly limited, but may be from 1 μm to 100 μm, and may be preferably from 5 μm to 50 μm.

Sizes of pores and porosity present in the porous substrate are not particularly limited as well, but may be from 0.001 μm to 50 μm and from 10% to 95%, respectively.

The electrolyte is placed between the positive electrode and the negative electrode, and includes a lithium salt and an electrolyte solvent.

The concentration of the lithium salt may be from 0.2 M to 2 M, specifically from 0.4 M to 2 M and more specifically from 0.4 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When the lithium salt concentration is used in less than 0.2 M, conductivity of the electrolyte may decrease causing decline in the electrolyte performance, and when the lithium salt concentration is used in excess of 2 M, viscosity of the electrolyte increases leading to a decrease in the lithium ion mobility.

The lithium salt may be used without limit as long as it is commonly used in electrolyte liquids for a lithium-sulfur battery. Examples thereof may include at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, chloroborane lithium, lower aliphatic carboxylic acid lithium and the like.

The electrolyte solvent is a non-aqueous organic solvent, and a single solvent may be used or a mixed organic solvent of two or more may also be used. When using a mixed organic solvent of two or more, selecting and using one or more solvents from two or more groups among a weak polar solvent group, a strong polar solvent group and a lithium metal protecting solvent group is preferred.

The weak polar solvent is defined as a solvent with a dielectric constant of smaller than 15 capable of dissolving sulfur elements among aryl compounds, bicyclic ethers and non-cyclic carbonates, the strong polar solvent is defined as a solvent with a dielectric constant of larger than 15 capable of dissolving lithium polysulfide among non-cyclic carbonates, sulfoxide compounds, lactone compounds, ketone compounds, ester compounds, sulfate compounds and sulfite compounds, and the lithium metal protecting solvent is defined as a solvent having charge and discharge cycle efficiency of 50% or greater and forming a stable solid electrolyte interface (SEI) on lithium metal such as saturated ether compounds, unsaturated ether compounds, and heterocyclic compounds including N, O, S or combinations thereof.

Specific examples of the weak polar solvent may include xylene, dimethoxyethane, 2-methyl tetrahydrofuran, diethyl carbonate, dimethyl carbonate, toluene, dimethyl ether, diethyl ether, diglyme, tetraglyme or the like.

Specific examples of the strong polar solvent may include hexamethyl phosphoric triamide, γ-butyrolactone, acetonitrile, ethylene carbonate, propylene carbonate, N-methyl pyrrolidone, 3-methyl-2-oxazolidone, dimethylformamide, sulfolane, dimethylacetamide, dimethyl sulfoxide, dimethyl sulfate, ethylene glycol diacetate, dimethyl sulfite, ethylene glycol sulfite or the like.

Specific examples of the lithium protecting solvent may include tetrahydrofuran, ethylene oxide, dioxolane, 3,5-dimethyl isoxazole, furan, 2-methylfuran, 1,4-oxane, 4-methyldioxolane or the like.

The electrolyte may include at least one types selected from the group consisting of a liquid electrolyte, a gel polymer electrolyte and a solid polymer electrolyte. The electrolyte may be preferably an electrolyte in a liquid state.

The electrolyte may be injected at a proper stage in an electrochemical device manufacturing process depending on a manufacturing process and required properties of a final product. In other words, the electrolyte liquid may be used at a stage prior to assembling an electrochemical device or at a final stage of electrochemical device assembly.

The lithium-sulfur battery according to the present invention may be manufactured by lamination (stack) and folding processes of a separator and an electrode in addition to winding, a general process.

The shape of the lithium-sulfur battery is not particularly limited, and may employ various shapes such as a cylinder-type, a lamination-type or a coin-type.

In addition, the present invention provides a battery module including the lithium-sulfur battery as a unit cell.

The battery module may be used as a power supply of medium to large-sized devices requiring high-temperature stability, long cycle properties and high rate properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the scope of the attached claims.

EXAMPLE AND COMPARATIVE EXAMPLE

Example 1

After uniformly mixing sulfur (4.2 g) and carbon nanotubes (1.8 g) in a reactor, the result was heat treated for 30 minutes at 155° C. to prepare a sulfur-carbon composite.

Meanwhile, dilithium oxalate was prepared by adding an aqueous lithium hydroxide solution to an aqueous oxalic acid solution, titrating to pH 8, and then drying the result.

After that, a positive electrode slurry composition was prepared by mixing the prepared sulfur-carbon composite (S:C=7:3) in 86.3% by weight as an active material, carbon black in 4.9% by weight as a conductive material, polyacrylic acid (PAA) in 6.8% by weight as a binder, and the dilithium oxalate prepared above in 2.0% by weight.

Subsequently, the prepared slurry composition was coated on an aluminum current collector, and the result was dried for 12 hours at 50° C. to prepare a positive electrode.

After that, a coin-type lithium-sulfur battery including the positive electrode prepared as above, a separator, a negative electrode and an electrolyte was manufactured.

Specifically, the positive electrode was punched as a phi circular electrode, and the polyethylene (PE) separator was punched as 19 phi, and as the negative electrode, 150 μm lithium metal was punched as 16 phi. In addition, an electrolyte formed with TEGDME/dioxolane (DOL)/dimethyl ether (DME) (1:1:1), $LiN(CF_3SO_2)_2$ (LiTFSI, 1 M) and $LiNO_3$ (0.1 M) was used.

Example 2

A lithium-sulfur battery was manufactured in the same manner as in Example 1 except that dilithium malonate was used in the same content instead of dilithium oxalate when preparing the positive electrode slurry composition.

Example 3

A lithium-sulfur battery was manufactured in the same manner as in Example 1 except that the positive electrode slurry composition was prepared by mixing the sulfur-carbon composite in 83.2% by weight, the conductive material in 4.9% by weight, the binder in 6.9% by weight and the dilithium oxalate in 5.0% by weight.

Example 4

A lithium-sulfur battery was manufactured in the same manner as in Example 1 except that lithium succinate was used in the same content instead of dilithium oxalate when preparing the positive electrode slurry composition.

Herein, the lithium succinate was prepared by adding an aqueous lithium hydroxide solution to an aqueous succinic acid solution, titrating to pH 8, and then drying the result.

Comparative Example 1

A lithium-sulfur battery was manufactured in the same manner as in Example 1 except that, when preparing the positive electrode slurry composition, dilithium oxalate was not used, and the sulfur-carbon composite:the conductive material:the binder were mixed in a weight ratio of 88:5:7.

Comparative Example 2

A lithium-sulfur battery was manufactured in the same manner as in Example 1 except that, when preparing the positive electrode, dilithium oxalate was not used, and the sulfur-carbon composite:the conductive material:the binder were mixed in a weight ratio of 88:5:7, and when preparing the electrolyte, dilithium oxalate was introduced in 0.5% by weight.

Comparative Example 3

A lithium-sulfur battery was manufactured in the same manner as in Example 1 except that lithium citrate was used in the same content instead of dilithium oxalate when preparing the positive electrode slurry composition.

Herein, the lithium citrate was prepared by adding an aqueous lithium hydroxide solution to an aqueous citric acid solution, titrating to pH 8, and then drying the result.

Experimental Example 1. Evaluation of Charge and Discharge Properties

For the batteries manufactured in the examples and the comparative examples, capacity was measured from 1.8 to 2.8 V voltage range using a charge and discharge measuring device. Specifically, charge and discharge efficiency was measured by repeating charge/discharge 2.5 times with an initial 0.1 C rate, repeating charge and discharge 3 times with a 0.2 C rate, then repeating a cycle of charging with a 0.3 C rate and discharging with a 0.5 C rate. Results obtained herein are shown in FIG. 1.

Experimental Example 2. Evaluation of Lifetime Properties

For the batteries manufactured in the examples and the comparative examples, specific discharge capacity and Coulombic efficiency were measured while repeating charge/discharge 2.5 times with a 0.1 C initial rate, repeating charge and discharge 3 times with a 0.2 C rate, then repeating a cycle of charging with a 0.3 C rate and discharging with a 0.5 C rate. Results obtained herein are shown in FIGS. 2 and 3.

When referring to FIGS. 1 to 3, it was identified that lifetime properties of the battery including the positive electrode according to the present invention were superior compared to the comparative examples.

Specifically, as shown in FIG. 1, it was identified that charge and discharge properties of the batteries according to the examples and the comparative examples were similar regardless of the use of additives. However, it was identified that an overvoltage occurs in an initial discharge curve due to an increase in the resistance in Comparative Example 3 using lithium citrate.

Meanwhile, in the lifetime properties, it was identified from FIGS. 2 and 3 that lifetime properties of the batteries including the positive electrodes of the examples were more superior compared to the comparative examples.

Specifically, as shown in FIG. 2 relating to a positive electrode composition, it was identified that specific discharge capacity was stably maintained even after 100 cycles when including the positive electrode of Example 1 compared to Comparative Example 1 that did not include an additive having a rapid capacity decrease from 90th cycle, and Comparative Example 3 including citrate from 30th cycle. In addition, through FIG. 3, it was identified that, compared to Example 1, specific discharge capacity steadily decreased and lifetime properties declined in Comparative Example 2 using an additive in an electrolyte.

INDUSTRIAL APPLICABILITY

By including a dicarboxyl group-including organic acid lithium salt as an additive, the positive electrode for a lithium-sulfur battery according to the present invention has improved lithium ion conducting properties, and enables a lithium-sulfur battery to have high capacity, high stability and long lifetime.

The invention claimed is:

1. A lithium-sulfur battery comprising:
a positive electrode, a negative electrode, a separator and an electrolyte,
wherein the electrolyte is interposed between the positive electrode and the negative electrode,
wherein the electrolyte comprises a liquid electrolyte,
wherein the positive electrode comprises:
an active material;
a conductive material;
a binder; and
an additive,
wherein the additive comprises an organic acid lithium salt comprising lithium bis(malonato)borate,
wherein the organic acid lithium salt is added to the positive electrode and not the electrolyte, and
wherein the active material comprises a sulfur-carbon composite.

2. The lithium-sulfur battery of claim 1, wherein the organic acid lithium salt further comprises dilithium malonate.

3. The lithium-sulfur battery of claim 1, wherein the organic acid lithium salt is included in an amount of from greater than 0.1% to less than 5% by weight, based on 100% by weight of a total positive electrode for a lithium-sulfur battery.

4. The lithium-sulfur battery of claim 1, wherein the organic acid lithium salt is included in an amount of from greater than 0.1% to less than 3% by weight, based on 100% by weight of a total positive electrode for a lithium-sulfur battery.

5. The lithium-sulfur battery of claim 1, wherein the electrolyte comprises a non-aqueous organic solvent selected from the group consisting of a weak polar solvent, a strong polar solvent, a lithium metal protecting solvent, and mixtures thereof.

6. The lithium-sulfur battery of claim 5, wherein the lithium metal protecting solvent is selected from the group consisting of tetrahydrofuran, ethylene oxide, dioxolane, 3,5-dimethyl isoxazole, furan, 2-methylfuran, 1,4-oxane, 4-methyldioxolane and mixtures thereof.

7. The lithium-sulfur battery of claim 1, wherein the lithium-sulfur battery has an operation voltage in a range of 1.8 V to 2.8 V.

* * * * *